(12) United States Patent
Schachar et al.

(10) Patent No.: US 6,721,104 B2
(45) Date of Patent: *Apr. 13, 2004

(54) SYSTEM AND METHOD FOR FOCUSING AN ELASTICALLY DEFORMABLE LENS

(75) Inventors: Ronald A. Schachar, Dallas, TX (US); Edward S. Kolesar, Fort Worth, TX (US)

(73) Assignee: PC Lens Corp, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/222,246

(22) Filed: Aug. 16, 2002

(65) Prior Publication Data

US 2003/0007236 A1 Jan. 9, 2003

Related U.S. Application Data

(60) Continuation-in-part of application No. 09/878,591, filed on Jun. 11, 2001, now Pat. No. 6,493,151, which is a continuation of application No. 09/514,555, filed on Feb. 28, 2000, now Pat. No. 6,246,528, which is a continuation of application No. 09/046,129, filed on Mar. 23, 1998, now Pat. No. 6,038,080, which is a division of application No. 08/439,942, filed on May 12, 1995, now Pat. No. 5,774,274.

(51) Int. Cl.[7] .............................. G02B 15/14; G02B 3/14
(52) U.S. Cl. ....................... 359/676; 359/666; 359/814; 359/824
(58) Field of Search ................................ 359/666, 676, 359/814, 824

(56) References Cited

U.S. PATENT DOCUMENTS 5,731,909 A * 3/1998 Schachar .................... 359/676

OTHER PUBLICATIONS

Kolesar, Edward S., et al.; "Thermally Actuated Microbeam for Large In–Plane Mechanical Deflections"; 1999 American Vacuum Society; J. Vac. Sci. Technol. A 17(4), Jul./Aug. 1999; pp. 2257–2263.

Howard, Jeffery T., et al.; "Design, Fabrication and Performance Evaluation of a Microelectromechanical Systems (MEMS) Actuator for Gripping and Focusing a Polymeric Lens"; 1999 ASEE/GSW Proceedings; pp. 1–8.

Kolesar, E. S., et al.; "Thermally–Actuated Cantilever Beam for Achieving Large In–Plane Mechanical Deflections"; Thin Solid Films 355–356 (1999); pp. 295–302.

Kolesar, Edward S., et al.; "Thermally–Actuated Beam Used to Achieve Large In–Plane Mechanical Forces and Deflections"; Proceedings of the 45th International Instrumentation Symposium; May 2–6, 1999, pp. 531–540.

Allen, Peter B., et al.; Design, Finite Element Analysis, and Experimental Performance Evaluation of a Thermally–Actuated Beam Used to Achieve Large In–Plane Mechanical Deflections; Technical Digest; Solid–State Sensor and Actuator Workshop; Jun. 8–11, 1998; pp. 5–6.

(List continued on next page.)

Primary Examiner—Scott J. Sugarman

(57) ABSTRACT

A system and method is disclosed for focusing an elastically deformable lens by making small changes in the equatorial diameter of the lens. A plurality of micro-electro mechanical system (MEMS) microengine assemblies are coupled to the periphery of the lens. The lens is focused by exerting and relaxing radial tension in a plane generally perpendicular to the optical axis of the lens. Each microengine assembly utilizes thermal beam actuator arrays in combination with mechanical links to move a slider unit that is coupled to an aperture in the periphery of the lens. The movement of the slider unit alters the diameter of the lens to change the focus of the lens. The lens diameter may be changed by amounts as small as one micron.

21 Claims, 14 Drawing Sheets

OTHER PUBLICATIONS

Kolesar, Edward S., et al.; In–Plane Tip Deflection and Force Achieved with Asymmetrical Polysilicon Electrothermal Microactuators; Thin Solid Films 377–378 (2000) 719–726.

Gottert, J., et al.; "High Aspect Ratio Microfabrication at Louisiana State University"; Textmems II; Second Texas–Area Workshop on Microelectromechanical Systems; May 16, 2000; pp. 11–12.

Allen, P. B., et al.; "Single–and Double–Hot Arm Polysilicon Surface Micromachined Electrothermal Actuators Applied to Realize a Microengine"; Solid–State Sensor and Actuator Workshop; Jun. 4–8, 2000, 2 pages.

Allen, P. B., et al.; "Theoretical and Experimental Characterization of the In–Plane Tip Force and Deflection Achieved with Asymmetrical Polysilicon Electrothermal Microactuators"; Micromachined Devices and Components VI; Sep. 18–19, 2000; vol. 4176; pp. 148–158.

Kolesar, E. S.; "Development of a Surface Micromachined Electrothermal Microengine"; MetroCon 2000—Enabling Technologies Track; MicroElectroMechanical Systems Workshop; Sep. 27, 2000; 9 pages.

Kahn, H.; "Materials Science of Microelectromechanical Systems (MEMS) Devices III"; Materials Research Society Symposium Proceedings vol. 657; Nov. 27–28, 2000, pp. EE5.34.1–EE5.34.6.

Kolesar, E. S., et al.; "Three–Dimensional Structures Assembled from Polysilicon Surface Micromachined Components Containing Continuous Hinges and Microrivets"; Thin Solid Films 398–399 (2001) pp. 566–571.

Kolesar, E. S., et al.; "Design and Performance of a Polysilicon Surface Micromachined Microengine Realized with Arrays of Asymmetrical Electrothermal Microactuators"; MEMS Design, Fabrication, Characterization, and Packaging; Proceedings of SPIE; SPIE—The International Society of Optical Engineering; May 30–Jun. 1, 2001; pp. 310–321.

Kolesar, E. S., et al.; "Evaluation of Latchable, Three–Dimensional, Microelectromechanical Systems (MEMS) Structures Containing Continuous Hinges and Microrivets"; IEEE Dallas Section; Emerging Technologies Symposium 2001 IEEE Emerging Technologies Symposium on Broadband Communications for the Internet Era Symposium Digest; Sep. 10–11, 2001; pp. 74–78.

Kolesar, E. S., et al.; "Three–Dimensional Microelectromechanical Systems (MEMS) Structures Which Can Be Assembled For Biotechnology Applications"; Biotechnology and Nano–Biotechnology; Challenges and Opportunities of Drug Targeting in the Post–Genomic Era; Oct. 18, 2001; pp. 16–17.

Kolesar, E. S., et al.; "Surface Micromachined Polysilicon Components Containing Continuous Hinges and Microrivets Used to Realize Three–Dimensional MEMS Structures"; Materials Research Society Symposium Proceedings vol. 687; Materials Science of Microelectromechanical Systems (MEMS) Devices IV; Nov. 25–28, 2001; pp. 83–87.

Kolesar, E. S., et al.; "Use of Continuous Hinges and Microrivets to Facilitate the Assembly of Three–Dimensional Polysilicon Microelectromechanical Systems (MEMS) Structures"; Microfabricated Systems and MEMS VI; Electrochemical Society Proceedings vol. 2002–6; pp. 84–89.

* cited by examiner

SYSTEM AND METHOD FOR FOCUSING AN ELASTICALLY DEFORMABLE LENS

CROSS REFERENCE TO RELATED APPLICATION

This patent application is related to and claims priority as a continuation-in-part of U.S. patent application Ser. No. 09/878,591 filed on Jun. 11, 2001 for "VARIABLE FOCUS LENS BY SMALL CHANGES OF THE EQUATORIAL LENS DIAMETER, is now U.S. Pat. No. 6,493,151" which is a continuation of prior U.S. patent application Ser. No. 09/514,555 filed on Feb. 28, 2000 now U.S. Pat. No. 6,246,528, which is a continuation of prior U.S. patent application Ser. No. 09/046,129 filed on Mar. 23, 1998 now U.S. Pat. No. 6,038,080, which is a division of prior U.S. patent application Ser. No. 08/439,942 filed on May 12, 1995 now U.S. Pat. No. 5,774,274. The disclosures in U.S. patent application Ser. No. 09/878,591 and in the related prior patents are hereby incorporated herein by reference for all purposes as if fully set forth herein.

The present invention is related to that disclosed and claimed in the following United States Non-Provisional Patent Applications: Ser. No. 10/222,124, filed concurrently herewith, entitled "SYSTEM AND METHOD FOR PROVIDING AN IMPROVED ELECTROTHERMAL ACTUATOR FOR A MICRO-ELECTRO-MECHANICAL DEVICE." Ser. No. 10/222,694, filed concurrently herewith, entitled "SYSTEM AND METHOD FOR PROVIDING A MICRO-ELECTRO-MECHANICAL MICROENGINE ASSEMBLY."

TECHNICAL FIELD OF THE INVENTION

This invention generally relates to elastically deformable lenses and, more particularly, to devices that are capable of focusing an elastically deformable lens.

BACKGROUND OF THE INVENTION

Variable focus lenses and lens systems have come to be extensively used because they provide convenient solutions to problems that frequently arise in applied optics. Optical systems incorporating such lenses can, for example, provide a focused image of objects at varying distances from the lens on an image plane without changing the distance between the lens and the image plane. They can also be used in optical systems that provide varying magnification without changing lenses.

A number of types of variable focus lenses have been devised. However, the design most widely used at present in optical instruments such as cameras, telescopes, binoculars and micro-scopes is a multi-element lens wherein the focal length is varied by changing the internal spacing of one or more of the elements along the optical axis.

Another class of variable focus lenses relies on changes in the refracting power of a single lens element effected by changes in the curvature of the refracting surfaces or the refractive index of the lens material.

U.S. Pat. No. 6,038,080 for "VARIABLE FOCUS LENS BY SMALL CHANGES OF THE EQUATORIAL LENS DIAMETER" issued on Mar. 14, 2000 to Ronald A. Schachar and U.S. Pat. No. 6,246,528 for "VARIABLE FOCUS LENS BY SMALL CHANGES OF THE EQUATORIAL LENS DIAMETER" issued on Jun. 12, 2001 to Ronald A. Schachar describe an elastically deformable lens of variable focal length that can be focused by making small changes in the equatorial lens diameter. The elastically deformable lens is focused by varying the optical power of the lens by radial stretching of the lens over a few percent of its diameter. The lens comprises a transparent elastic body having two opposed optical refracting surfaces intersecting an optical axis. Incorporated into a periphery surrounding the optical axis are means for expanding the periphery of the elastic body in a plane generally perpendicular to the optical axis by an amount not exceeding about five percent (5%) of its relaxed diameter. The optical power of the elastically deformable lens may be increased by expanding the periphery of the lens in a plane generally perpendicular to the optical axis of the lens by an amount not exceeding about five percent (5%) of its relaxed diameter.

Presently existing systems and methods for focusing an elastically deformable lens are not capable of focusing a relatively small lens that is located within a restricted volume. For example, consider an elastically deformable lens that is approximately the size of the lens of a human eye. Such a lens has an optically active diameter that spans three to five millimeters (3 mm to 5 mm). It has been shown that the application of tensile and compressive forces at various locations around the periphery of such a lens induces surface curvature that causes the lens to have the ability to focus on near or far objects with an optical power that exceeds forty (40) diopters. If such a lens could be implanted and made to operate within a human eye, it could serve as a replacement lens for persons who have lost a lens through disease or accident.

The prior art systems and methods for focusing such a lens are too large, bulky, expensive, and impractical to be used to accomplish such a task. The prior art hardware for focusing such a lens is much too large to be implanted within a human eye.

Therefore there is a need in the art for an improved system and method for focusing an elastically deformable lens. There is also a need in the art for an improved system and method for focusing a relatively small lens that is located within a restricted volume. There is also a need in the art for an improved system and method for focusing an elastically deformable variable focus lens that is inexpensive, accurate and small in size.

SUMMARY OF THE INVENTION

The present invention comprises a system and method for focusing an elastically deformable lens using a plurality of micro-electro mechanical system (MEMS) microengine assemblies to vary the optical power of the lens by radially stretching the lens over a few percent of the diameter of the lens. The lens comprises a transparent elastic body having two opposed optical refracting surfaces intersecting an optical axis. The microengine assemblies are coupled to the periphery of the lens. Each microengine assembly comprises an electrothermally actuated microengine and a latching element that couples the microengine to the periphery of the lens. In response to receiving control signals from a controller, each microengine provides mechanical translations to move the periphery of the lens either forward or backward to provide the compressive or tensile forces to focus the lens.

Each microengine assembly is capable of functioning in two distinct modes. In the first mode, each microengine assembly is capable of producing macroscopic mechanical translations on the order of two hundred microns (200 $\mu$m) in order to engage the latching element of the microengine assembly with an aperture through the periphery of the lens. In the second mode, each microengine assembly is capable of producing microscopic mechanical translations on the order of one micron (1 μm) in order to focus the lens.

It is an object of the present invention to provide a system and method for focusing an elastically deformable variable focus lens.

It is another object of the present invention to provide a system and method for focusing an elastically deformable variable focus lens in which small changes in the equatorial diameter of the lens are produced by a plurality of micro-electro mechanical systems (MEMS) microengine assemblies.

It is also an object of the present invention to provide a system and method for focusing an elastically deformable variable focus lens that is inexpensive, accurate and small in size.

Further objects of the invention will become apparent from the description of the invention that follows.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

Figure 1:
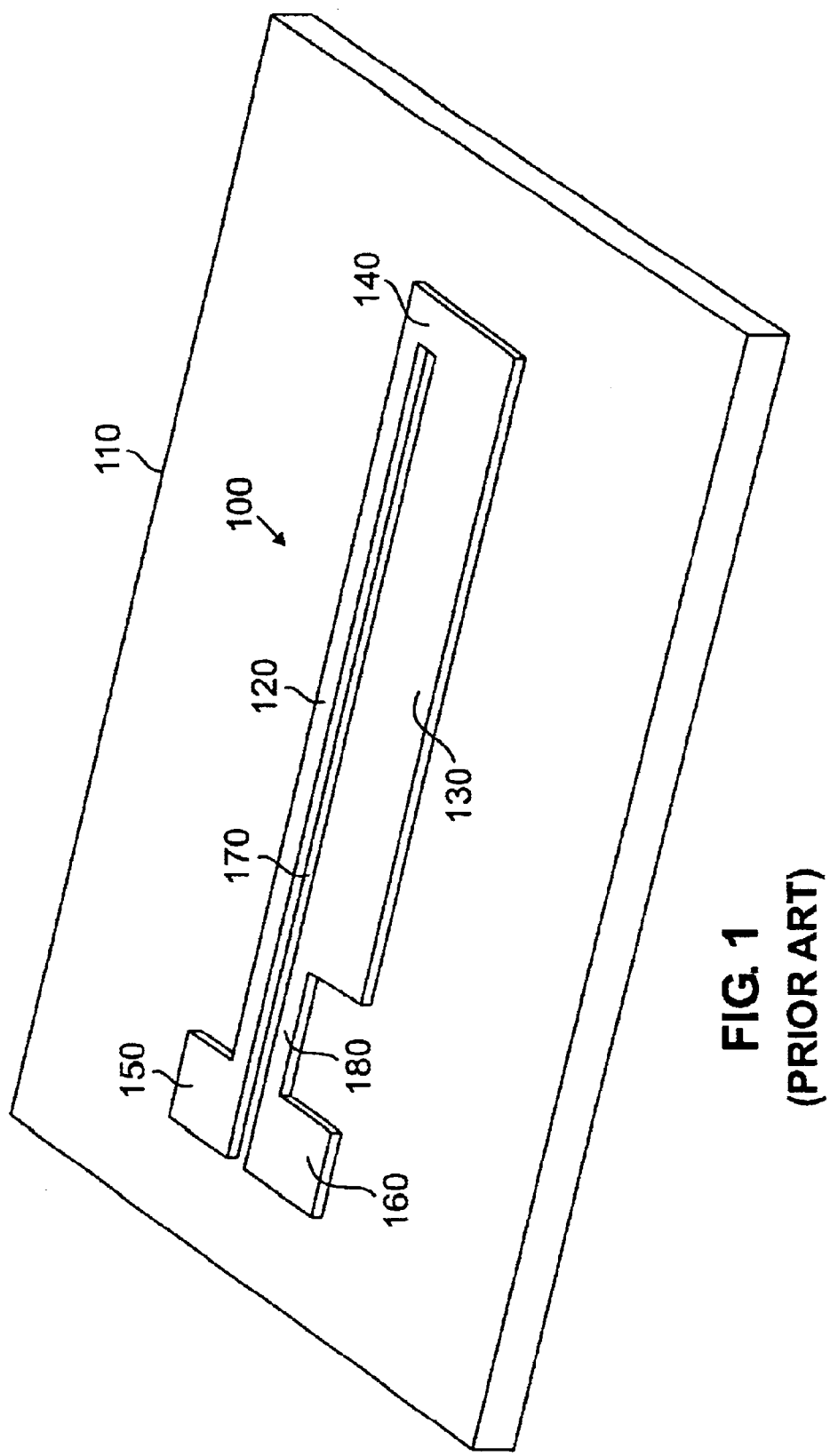
FIG. 1 illustrates a perspective view of a prior art thermal beam actuator.

FIGS. 1 through 16, discussed below, and the various embodiments used to describe the principles of the present invention in this patent document are by way of illustration only and should not be construed in any way to limit the scope of the invention. Those skilled in the art will understand that the principles of the present invention may be implemented for any suitable type of elastically deformable lens using any suitable type of electrothermally actuated microengine assembly.

The curvature of the optical surfaces of an elastically deformable optical lens changes when the periphery of the lens is radially expanded by a small amount in a plane generally perpendicular to the optical axis. It is natural to assume that radial stretching of such an elastic lens would result in the center thickness of the lens being decreased with resulting increase in the radii of curvature of the optical refracting surfaces which would cause the optical power of the lens to be reduced. Indeed, a decrease in optical power may be observed in an elastically deformable lens (also sometimes referred to as an elastomeric lens) when it is severely stretched.

The present invention relates to an elastically deformable lens whose optical power can be varied by small changes in its equatorial diameter. Such a lens comprises an elastically deformable transparent lens body having two optically refracting surfaces intersecting an optical axis and a periphery surrounding said optical axis and means for expanding the periphery of the lens body by an amount not exceeding about five (5%) of the relaxed diameter of the periphery.

The invention is applicable to all elastically deformable lenses in conventional lens shapes, i.e., biconvex, biconcave, plano-convex, plano-concave, concavo-convex, or biplano lenses, whether the refracting surfaces are spherical, aspheric, cylindrical, toric or the like. That is, the invention extends to positive, negative and zero-power lenses of all types and thicknesses, including those made from homogeneous optical materials, graded index optical materials (GRIN lenses), fluid-filled lenses of all shapes and wall thicknesses, whether of constant or variable wall thickness, Fresnel lenses, and diffractive optical elements (DOE).

In accordance with the principles of the present invention, the focal length or optical power of an elastically deformable lens is altered by small changes in its equatorial diameter. Typically, an elastically deformable lens is mounted in a cell that initially exerts enough tension to support the lens and stabilize it in a rest, or stabilized position. The mounting and tension-exerting elements are ordinarily positioned about the periphery or equator of the lens and are disposed to exert tension in a plane oriented generally perpendicular to the optical axis of the lens. Ordinarily, the initial stabilizing tension will be relatively small and will produce no substantial distortion of the natural shape of the lens. In this application the conformation of the lens in this state of little or no tension will be referred to as the relaxed state of the lens. In order to alter the focal length or optical power of the lens the radial tension is increased to a value that causes the equatorial diameter of the lens to be increased slightly, up to five percent (5%) of its relaxed diameter, and preferably up to two percent (2%) to three percent (3%) of its relaxed diameter. As the equatorial diameter undergoes this small increase, one or both of the optical refracting surfaces of the lens are changed in a unique way. The refracting surface becomes flattened near the periphery with consequent steeper curvature in the central zone of the lens, i.e., the zone immediately surrounding the optical axis. The result is that for such small increases in equatorial diameter, the optical power of the central zone of the lens is increased, not decreased as might be expected. Correspondingly, the focal length of the central zone of the lens is shortened.

The elastically deformable lens of the invention may be constructed of any optically suitable material that can undergo elastic deformation of sufficient magnitude to exhibit the change in optical power of the lens according to the invention. The material must be generally transparent to wavelengths that are intended to be focused by the lens. Thus, lenses intended for use in the visible region of the spectrum must be generally transparent at visible wavelengths, while lenses intended for use at infrared wavelengths must be transparent to infrared radiation, but not necessarily to visible radiation. Evidently, some scattering of radiation and optical imperfection can be tolerated in the lens if it is intended for non-critical use. However, in general the material should be as transparent as possible in the wavelength region of interest.

The elastically deformable lens element used in lenses according to the invention can be made of solid elastically deformable materials formed into the shape of the resting lens element. The solid elastically deformable lenses may be made, for example, of synthetic polymers such as silicone rubbers, polyethylene, polypropylene, modified polystyrenes, transparent polyurethane elastomers and the like. It will be recognized by one skilled in the art that the material used should desirably exhibit high transparency, i.e., low optical absorbance and low light scattering at the wavelength of interest. The properties of the different elastically deformable optical materials are well known or can be measured. Consequently, the practitioner will have no difficulty selecting an appropriate material for a given lens application. Such lenses may be molded or cast by conventional procedures in the shape of biconvex, plano-convex, biconcave, plano-concave, plano-plano, or meniscus lenses and the like. The lenses may also be formed by machining optical surfaces onto transparent elastically deformable bodies by conventional procedures for machining such materials, e.g., by rigidifying them by chilling and performing the machining operations in that state of the material.

The lens bodies for use in the invention may also be fluid- or gel-filled bladders or balloons. A lens of this type may be constructed by forming a balloon or bladder of transparent material, e.g., of polyethylene terephthalate, and filling the balloon with a fluid material, e.g., liquid or gas, or a transparent low-scattering deformable gel. Suitable materials for filling a balloon lens include water, aqueous solutions of water-soluble inorganic and organic solids, organic liquids, mixtures of water and water-miscible organic liquids and silicone oils. Organic liquids and soluble inorganic salts containing halogen such as chlorine, bromine and iodine in covalently bonded or ionic form are useful as filling materials of relatively high refractive index. Mixtures of water and water-miscible organic compounds such as glycols and polyethylene glycols are useful filling materials.

The balloon or bladder is then mounted in position on an optical axis and suspended thereon by means connected to the periphery of the lens for exerting radially outwardly directed tension in a plane passing through the lens body. When a low level of tension has been exerted, the lens assumes a stable shape within the mounting means, i.e., is in a stabilized state, defined in this application as the relaxed state of the lens. Further, radial tension on the periphery of the fluid- or gel-filled lens body that expands the periphery of the lens body by up to five percent (5%) causes the optical surfaces to undergo the characteristic change in shape of this invention, whereby the curvature of the central zone of the lens is increased, thereby increasing the optical power of the lens.

Prior art systems and methods are not capable of focusing a small lens within a restricted volume because they are generally too large, bulky, expensive, and impractical. For example, consider an elastically deformable lens to be used as a replacement lens for a human eye. The hardware of prior art systems cannot be used because for such a task because the hardware is much too large to be implanted within a human eye.

The improved system and method of the present invention is capable of accurately focusing a small lens within a restricted volume. The improved system and method of the present invention utilizes micro-electro-mechanical system (MEMS) devices that are capable of generating tensile and compressive forces on the order of five to fifteen microNewtons (5 $\mu$N to 15 $\mu$N). These forces are capable of accurately focusing an elastically deformable lens that is approximately the size of the lens of a human eye.

As will be more fully described, the micro-electromechanical system (MEMS) devices of the present invention comprise a plurality of microengine assemblies, each of which is coupled to a periphery of the lens. Each microengine assembly comprises an electrothermally actuated microengine and a latching element that couples the microengine to the periphery of the lens. In response to receiving control signals from a controller, each microengine provides mechanical force to move the periphery of the lens either forward or backward to provide the compressive or tensile forces to focus the lens.

Each microengine assembly is capable of functioning in two distinct modes. In the first mode, each microengine assembly is capable of producing macroscopic mechanical translations on the order of two hundred microns (200 $\mu$m) in order to engage the latching element of the microengine assembly with an aperture through the periphery of the lens. In the second mode, each microengine assembly is capable of producing microscopic mechanical translations on the order of one micron (1 $\mu$m) in order to focus the lens.

Electrothermal actuators are used in micro-electromechanical devices to provide force to move elements of the micro-electro-mechanical device. Electrothermal actuators use ohmic heating (also referred to as Joule heating) to generate thermal expansion and movement. Electrothermal actuators are typically capable of providing lateral deflections of eight microns (8 $\mu$m) to ten microns (10 $\mu$m). A micron is one millionth of a meter. Electrothermal actuators typically require drive voltages of approximately five volts (5 v).

FIG. 1 illustrates a perspective view of a prior art thermal beam actuator 100 mounted on a dielectric substrate 110. Micro-electro-mechanical systems (MEMS) technology is used to form thermal beam actuator 100 from a layer of polysilicon deposited on a dielectric substrate 110 such as silicon nitride. The components of thermal beam actuator 100 are formed from a common layer of polysilicon.

Thermal beam actuator 100 comprises first arm 120 and second arm 130. First arm 120 and second arm 130 are joined together at one end with a rigid polysilicon mechanical link 140. The end of thermal beam actuator 100 that comprises mechanical link 140 is able to move laterally and parallel to the surface of substrate 110. This end of thermal beam actuator 100 is therefore referred to as the "free" end.

The other end of first arm 120 is coupled to anchor 150 and the other end of second arm 130 is coupled to anchor 160. Anchor 150 and anchor 160 are in turn coupled to substrate 110. This end of thermal beam actuator 100 is therefore referred to as the "fixed" end.

As shown in FIG. 1, thermal beam actuator 100 is formed having portions that define a gap 170 between first arm 120 and second arm 130. Gap 170 is formed by an interior edge of first arm 120 and by an interior edge of second arm 130. The width of gap 170 is determined by the width of mechanical link 140. Air in gap 170 provides electrical insulation between first arm 120 and second arm 130.

The width of second arm 130 is greater than the width of first arm 120 for most of the length of thermal beam actuator 100. As shown in FIG. 1, thermal beam actuator 100 is formed having portions that define a flexure portion 180 of second arm 130. Flexure portion 180 usually has a width that is the same width as first arm 120. A first end of flexure portion 180 is attached to anchor 160 and a second end of flexure portion 180 is attached to the end of the wide portion of second arm 130 that is adjacent to flexure portion 180.

Electric current (from an electrical source not shown in FIG. 1) may be passed through anchor 150, through first arm 120, through mechanical link 140, through second arm 130, through flexure portion 180, through anchor 160, and back to the electrical source. Alternatively, electric current (from an electrical source not shown in FIG. 1) may be passed through anchor 160, through flexure portion 180, through second arm 130, through mechanical link 140, through first arm 120, through anchor 150, and back to the electrical source.

Because the width of first arm 120 is narrower than the width of second arm 130 (with the exception of flexure portion 180), the current density in first arm 120 will be greater than the current density in the wider portion of second arm 130. The larger current density in first arm 120 causes first arm 120 to become hotter than second arm 130. For this reason first arm 120 is sometimes referred to as a "hot" arm 120 and second arm 130 is sometimes referred to as a "cold" arm 130. The higher level of heat in first arm 120 causes the thermal expansion of first arm 120 to be greater than the thermal expansion of second arm 130.

Because first arm 120 and second arm 130 are joined at the free end of thermal beam actuator 100 by mechanical link 140, the differential expansion of first arm 120 and second arm 130 causes the free end of thermal beam actuator 100 to move in an arc-like trajectory parallel to the surface of substrate 110. When the electric current is switched off, the heating of first arm 120 and second arm 130 ceases. Then first arm 120 and second arm 130 cool down. As first arm 120 and second arm 130 cool down they return to their equilibrium positions.

The essential requirement for generating deflection in thermal beam actuator 100 is to have one arm expand more than the other arm. Prior art thermal beam actuators such as thermal beam actuator 100 are capable of producing lateral deflections (i.e., deflections parallel to the plane of substrate 110) on the order of five microns (5.0 μm) with typical drive voltages that are less than seven volts (7.0 v).

Figure 2:
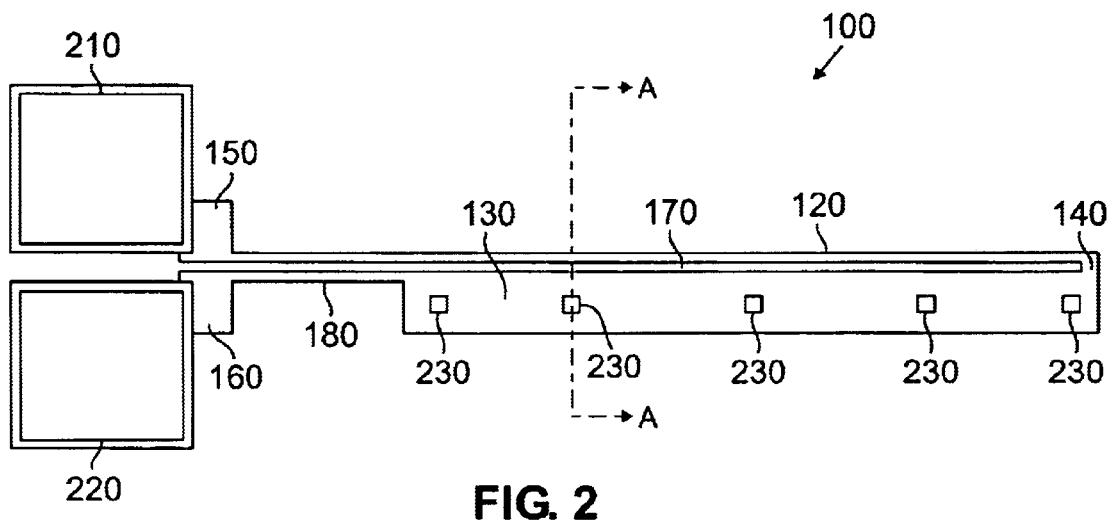
FIG. 2 illustrates a plan view of the thermal beam actuator shown in FIG. 1.

FIG. 2 illustrates a schematic plan view of thermal beam actuator 100. Anchor 150 is coupled to electrical connector 210 and anchor 160 is coupled to electrical connector 220. Electrical connector 210 and electrical connector 220 are coupled to a source of electric current (not shown in FIG. 2). Portions of the surface of second arm 130 adjacent to substrate 110 are formed into a plurality of support dimples 230 spaced along the length of second arm 130. The plurality of support dimples 230 position second arm 130 above substrate 110 and serve as near frictionless bearings as second arm 130 moves laterally across the surface of substrate 110. An exemplary placement of the plurality of support dimples 230 along second arm 130 is shown in FIG. 2. Although the support dimples 230 are located under second arm 130, they are shown in FIG. 2 in solid outline (rather than in dotted outline) for clarity.

Figure 3:
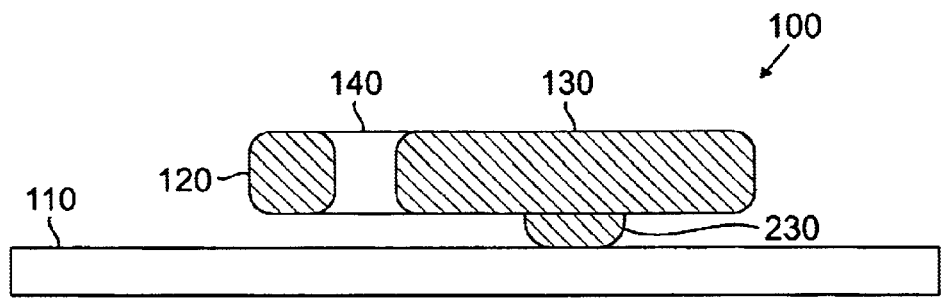
FIG. 3 illustrates a cross sectional view of the thermal beam actuator shown in FIG. 2 taken along line A—A.

FIG. 3 illustrates a cross sectional view of thermal beam actuator 100 taken along line A—A of FIG. 2. FIG. 3 shows how second arm 130 is positioned above substrate 110 by the plurality of support dimples 230.

Thermal beam actuator 100 may be constructed using the following typical dimensions. First arm 120 is one hundred ninety microns (190 μm) long, two microns (2 μm) wide, and two microns (2 μm) thick. Flexure portion 180 of second arm 130 is forty microns (40 μm) long, two microns (2 μm) wide, and two microns (2 μm) thick. The remaining portion of second arm 130 is one hundred fifty microns (150 μm) long, fifteen microns (15 μm) wide, and two microns (2 μm) thick. The width of gap 170 determined by mechanical link 140 is two microns (2 μm). Each support dimple 230 is five microns (5 μm) long, five microns (5 μm) wide, and one micron (1 μm) thick. Anchor 150 and anchor 160 are each fifteen microns (15 μm) long and fifteen microns (15 μm) wide. Electrical connector 210 and electrical connector 220 are each one hundred microns (100 μm) long and one hundred microns (100 μm) wide. These dimensions are exemplary. Other dimensions may be used to construct thermal beam actuator 100.

Figure 4:
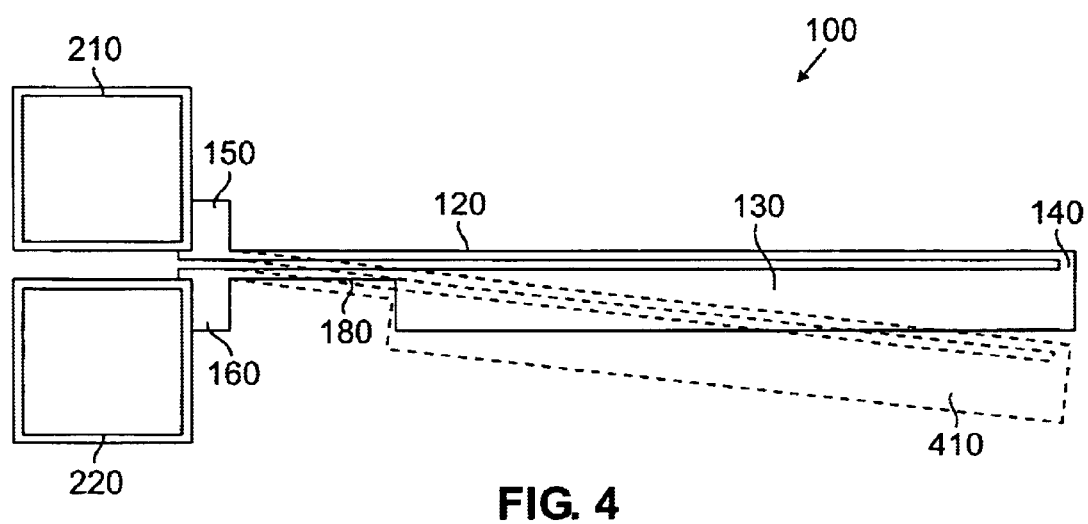
FIG. 4 illustrates a plan view of the thermal beam actuator shown in FIG. 1 showing how a thermal beam actuator may be deflected in a forward direction in a basic "thermoelastic" deflection mode.
Figure 5:
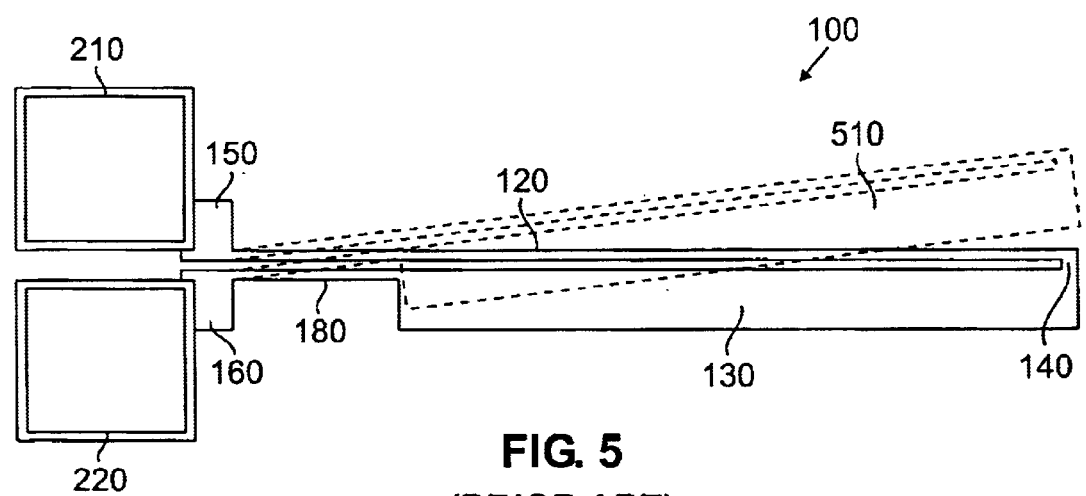
FIG. 5 illustrates a plan view of the thermal beam actuator shown in FIG. 1 showing how a thermal beam actuator may be deflected in a backward direction in an alternate "thermoplastic" deflection mode.

As shown in FIG. 4 and in FIG. 5, thermal beam actuator 100 can be operated in two modes. In the basic "thermo-elastic" mode (illustrated in FIG. 4) electric current is passed through thermal beam actuator 100 from electrical connector 210 to electrical connector 220 (or vice versa). The higher current density in first arm 120 (the narrower hot arm) causes it to heat and expand more than second arm 130 (the wider cold arm). As previously explained, the differential expansion of first arm 120 and second arm 130 causes the free end of thermal beam actuator 100 to move in an arc about flexure portion 180 that is attached to anchor 160. The deflected position of thermal beam actuator 100 is shown in dotted outline 410 in FIG. 4. Switching off the electric current allows thermal beam actuator 100 to return to its equilibrium state.

The alternate "thermo-plastic" mode of operation (illustrated in FIG. 5) is used to create a permanent deformation in first arm 120 (the narrower hot arm) of thermal beam actuator 100. The permanent deformation is accomplished by supplying enough electric current to cause plastic deformation of the polysilicon of first arm 120. In general, the amount of electric current necessary to create a permanent deformation of first arm 120 is slightly higher than the electric current needed to generate the maximum deflection of the end of thermal beam actuator 100. When the electric current is switched off, thermal beam actuator 100 is left permanently "back bent" from its original position due to bowing or buckling of first arm 120. The amount of deformation or "back bending" depends on the amount of overcurrent that is applied. The "back bent" position of thermal beam actuator 100 is shown in dotted outline 510 in FIG. 5. After back bending, thermal beam actuator 100 can be operated in the basic "thermo-elastic" mode. Back bending is particularly useful for the one time positioning of thermal beam actuator 100 and as a tool for the assembly of complex devices.

Figure 6:
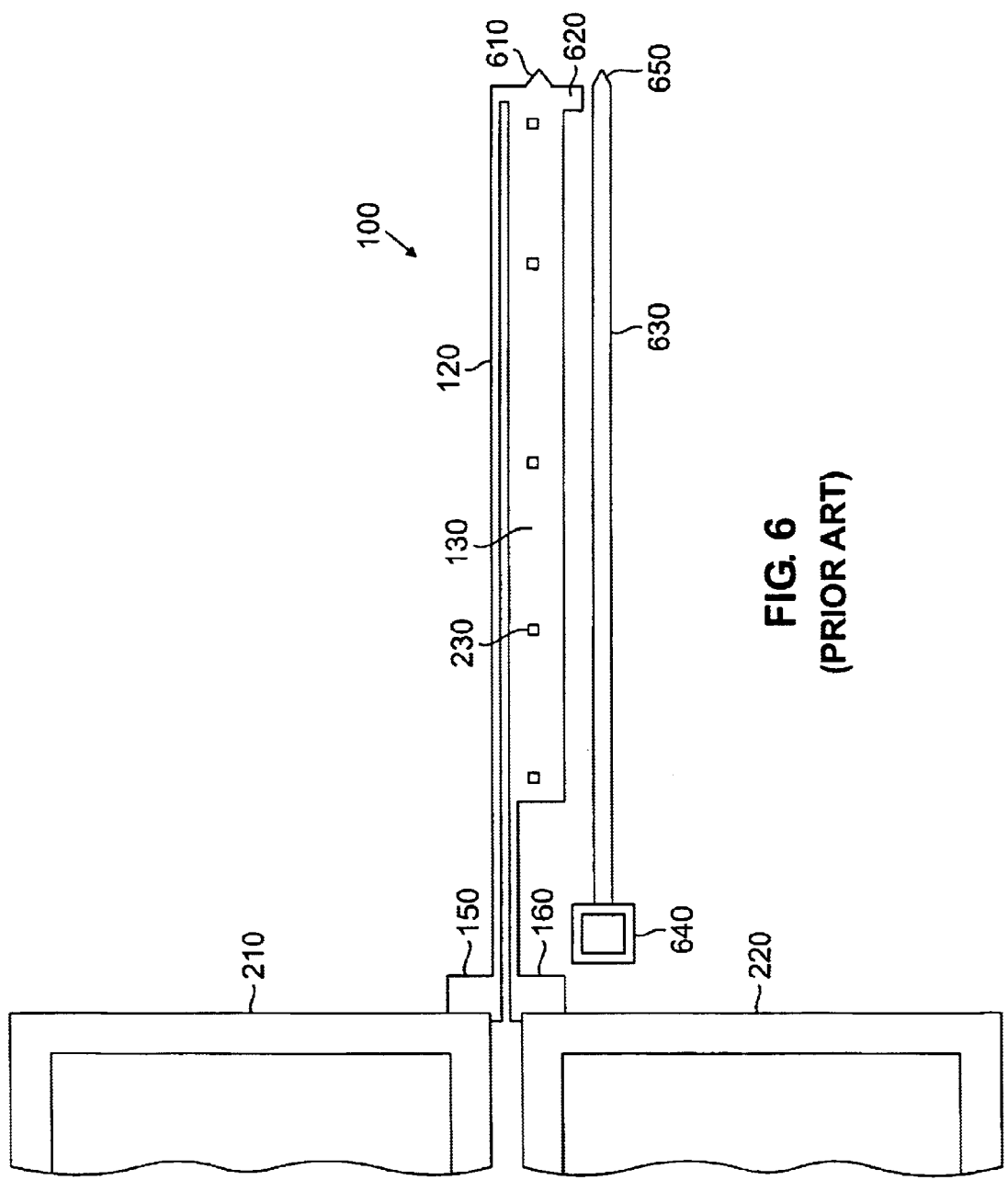
FIG. 6 illustrates a plan view of the thermal beam actuator shown in FIG. 1 and a parallel cantilever beam for measuring lateral deflections of the thermal beam actuator.

FIG. 6 illustrates how a cantilever beam 630 may be used to experimentally measure the force that can be generated at the free end of activated thermal beam actuator 100. Cantilever beam 630 is positioned parallel to second arm 130 and affixed to anchor 640 which is in turn affixed to substrate 110. Cantilever beam 630 is typically five microns (5 μm) wide. One micron (1 μm) square support dimples (not shown) are placed under cantilever beam 630 to support cantilever beam 630 above substrate 110 and to minimize frictional losses as cantilever beam 630 is moved across the surface of substrate 110 by thermal beam actuator 100.

As shown in FIG. 6, second arm 130 of thermal beam actuator 100 is formed having portions that define a pointed tip 610 to facilitate a measurement of the amount of deflection of the free end of thermal beam actuator 100. Similarly, the free end of cantilever beam 630 is formed into a pointed tip 650 to facilitate a measurement of the amount of deflection of cantilever beam 630. Second arm 130 of thermal beam actuator 100 is also formed having portions that define a contact extension 620 for abutting cantilever beam 630 when thermal beam actuator 100 is deflected. The physical gap between contact extension 620 and cantilever beam 630 is typically two microns (2 μm).

Figure 7:
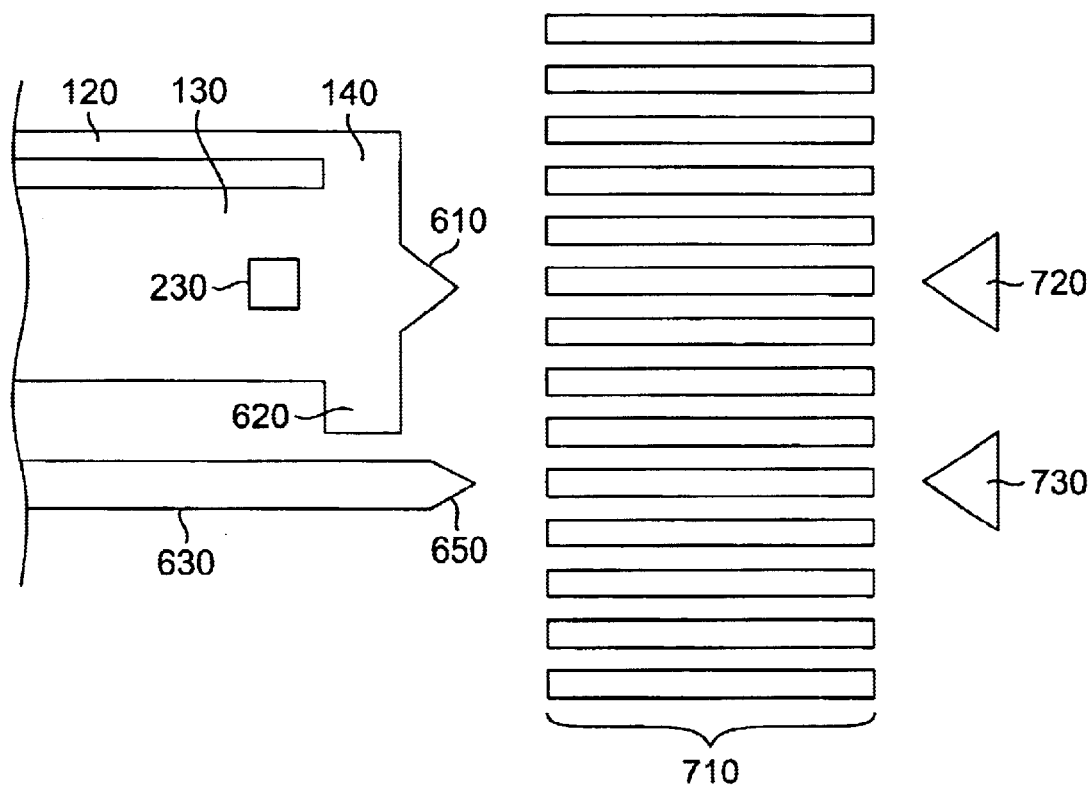
FIG. 7 illustrates an enlarged view of the free end of the thermal beam actuator and the free end of the cantilever beam shown in FIG. 6 and a deflection scale for measuring the deflection of the ends of the thermal beam actuator and the cantilever beam.

FIG. 7 illustrates a deflection scale 710 for measuring the deflection of thermal beam actuator 100 and cantilever beam 630. Deflection scale 710 is fabricated on the surface of substrate 110. The scale marking of deflection scale 710 are typically two microns (2 μm) wide. Deflection scale thermal beam indicator 720 fabricated on the surface of substrate 110 marks the equilibrium position of thermal beam actuator 100. Deflection scale cantilever beam indicator 730 fabricated on the surface of substrate 110 marks the equilibrium position of cantilever beam 630.

Activation of thermal beam actuator 100 causes second arm 130 to deflect toward cantilever beam 630. Deflection of second arm 130 causes contact extension 620 to abut cantilever beam 630 and to deflect cantilever beam 630. The deflection of thermal beam actuator 100 and the deflection of cantilever beam 630 are accurately measured by observing the position of tip 610 and tip 650 on deflection scale 710. In this manner it is possible to measure the magnitude of tip deflection versus applied electric current and power. This information enables one to obtain the amount of force "F" (in micro Newtons) exerted by thermal beam actuator 100 on cantilever beam 630 using the following equation:

$$F = \frac{Eh}{4}\left(\frac{b}{k}\right)^3 d \quad (1)$$

where "F" is the force applied to cantilever beam 630, "E" is the Young's modulus of elasticity of cantilever beam 630, "h" is the width of cantilever beam 630, "b" is the thickness of cantilever beam 630, "k" is the suspended length of cantilever beam 630, and "d" is the deflection of cantilever beam 630. Equation (1) ignores losses due to friction as cantilever beam 630 moves across the surface of substrate 110.

Consider a thermal beam actuator 100 having the following dimensions. First arm 120 is two hundred microns (200 μm) in length, two microns (2 μm) in width and two microns (2 μm) in thickness. Second arm 130 is one hundred seventy microns (170 μm) in length, fourteen microns (14 μm) in width and two microns (2 μm) in thickness. Flexure portion 180 is thirty microns (30 μm) in length, two microns (2 μm) in width and two microns (2 μm) in thickness. A typical applied voltage of four and three tenths volts (4.3 v) produces an applied current of three and eight tenths milliamps (3.8 mA) and an applied power of sixteen and three tenths milliwatts (16.3). This causes the tip of thermal beam actuator 100 to be deflected by eight microns (8 μm)

When thermal beam actuator 100 deflects cantilever beam 630 by eight microns (8 μm), the value of "d" in Equation (1) is eight microns (8 μm). Equation (1) may then be used to calculate that a deflection of eight microns (8 μm) corresponds to a force of four micro Newtons (4 μN) exerted by thermal beam actuator 100.

Figure 8:
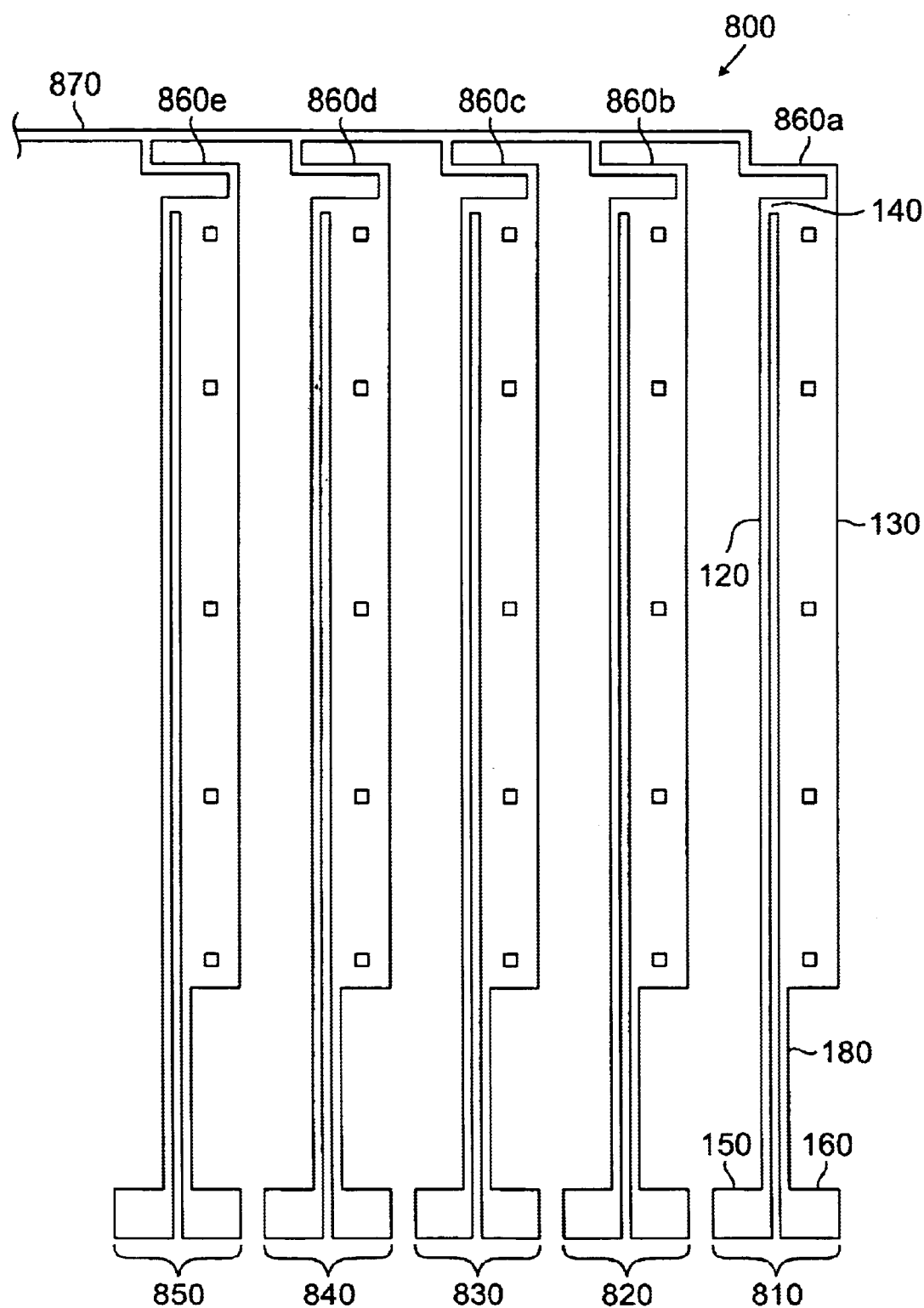
FIG. 8 illustrates a plan view of a thermal beam actuator array comprising a plurality of prior art thermal beam actuators.

An array of thermal beam actuators may be used in applications that require more force than a single thermal beam actuator can supply or when linear motion is required. FIG. 8 provides an example of how a plurality of prior art thermal beam actuators (810, 820, 830, 840, 850) may be grouped together to form a thermal beam actuator array 800. The free end of each thermal beam actuator in array 800 is formed having portions that define a connecting link (860a, 860b, 860c, 860d, 860e) that is coupled to a common mechanical yoke 870. The combined force exerted by the thermal beam actuators in array 800 is exerted on mechanical yoke 870. Mechanical yoke 870 is a critical component in thermal beam actuator array 800 because it combines the motion and the force of the thermal beam actuators in array 800 in a linear deflection. Each thermal beam actuator in thermal beam actuator array 800 comprises a thermal beam actuator 100.

Figure 9:
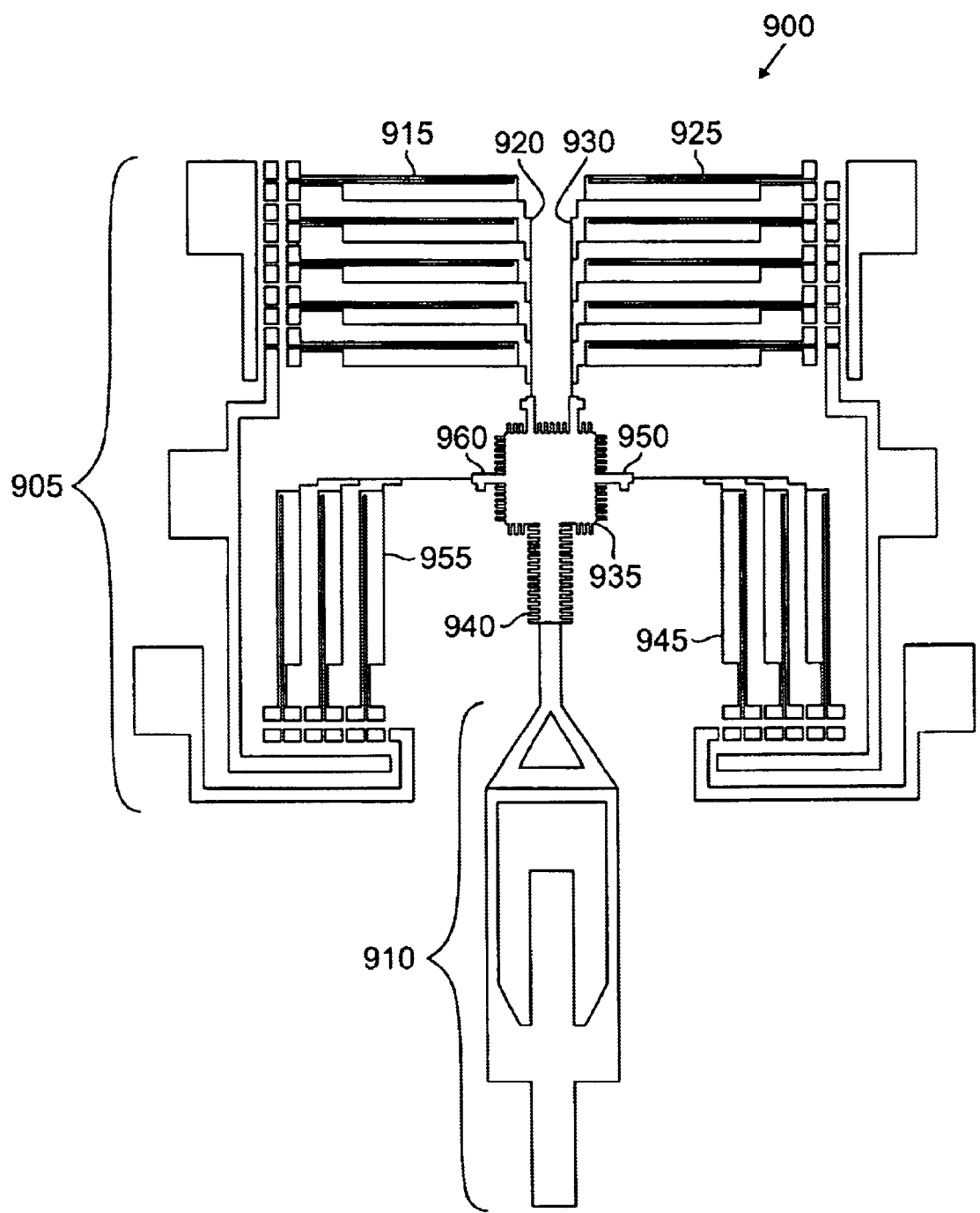
FIG. 9 illustrates an electrothermally actuated microengine and latching unit.
Figure 10:
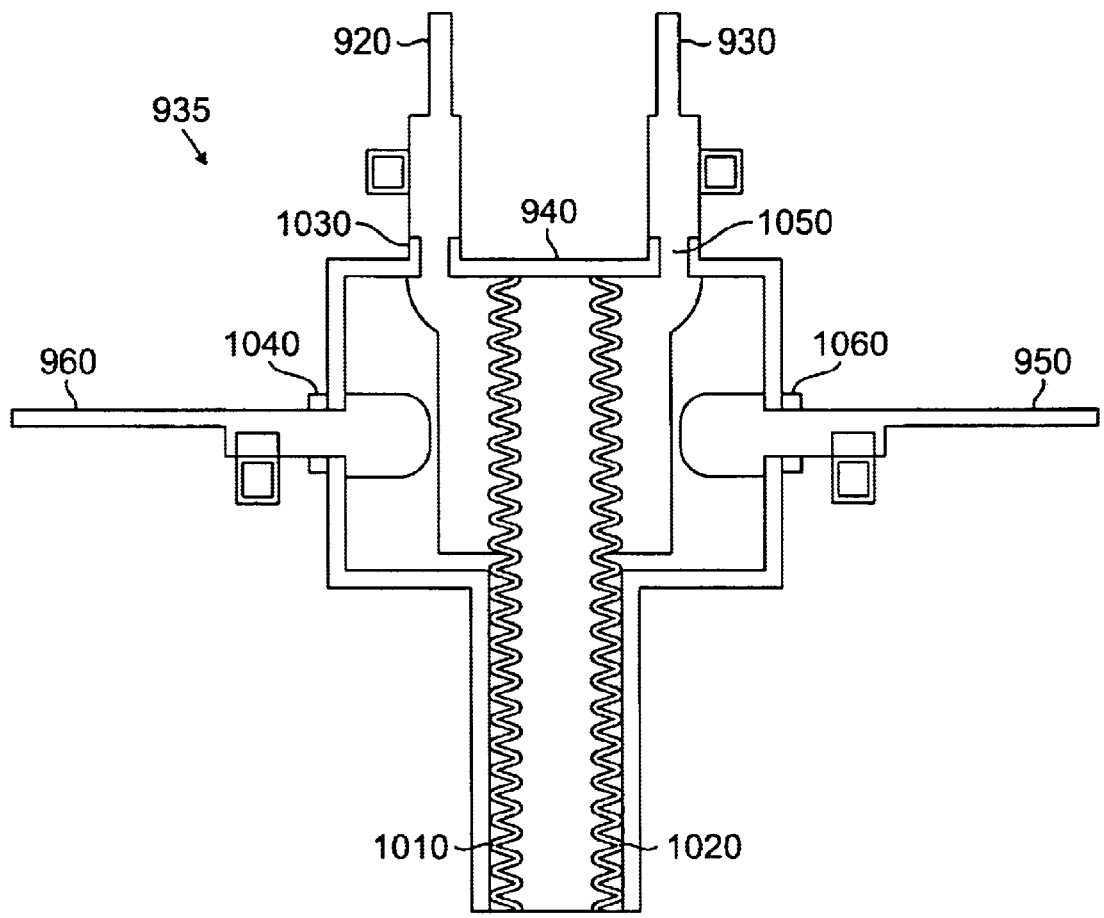
FIG. 10 illustrates a detailed view of a translation unit of the electrothermally actuated microengine shown in FIG. 9.

Thermal beam actuator arrays may be used to construct an electrothermally actuated microengine. FIG. 9 illustrates an exemplary electrothermally actuated microengine 905 coupled to an exemplary latching unit 910. The combination of microengine 905 and latching unit 910 will be collectively referred to as microengine assembly 900.

Microengine 905 comprises first thermal beam actuator array 915, second thermal beam actuator array 925, third thermal beam actuator array 945, and fourth thermal beam actuator array 955. Second thermal beam actuator array 925 is designed to deflect in a direction that is opposite to the direction of deflection of first thermal beam actuator array 915. Fourth thermal beam actuator array 955 is designed to deflect in a direction that is opposite to the direction of deflection of third thermal beam actuator array 945. As will be more fully described, the operation of thermal beam actuator arrays 915, 925, 945 and 955 provide linear motion to latching unit 910.

Microengine 905 comprises a translation unit 935 that is capable of utilizing the microforces that are generated by the thermal beam actuator arrays 915, 925, 945 and 955. The operation of microengine 905 may be understood by considering the operation of translation unit 935. The structure of translation unit 935 is shown in detail in FIG. 10. Translation unit 935 comprises a centrally disposed slider unit 940 having a first geared edge 1010 on one side and a second geared edge 1020 on an opposite side. As shown in FIG. 9, slider unit 940 is coupled to latching unit 910. Latching unit 910 moves in response to the movement of slider unit 940.

Translation unit 935 comprises a geared pawl 1030 that is coupled to mechanical yoke 920 of first thermal beam actuator array 915. Translation unit 935 also comprises engagement member 1040 that is coupled to mechanical yoke 960 of fourth thermal beam actuator array 955. When engagement member 1040 is moved laterally into contact with geared pawl 1030, geared pawl 1030 engages first geared edge 1010 of slider unit 940. When engagement member 1040 is moved laterally out of contact with geared pawl 1030, geared pawl 1030 disengages first geared edge 1010 of slider unit 940.

Translation unit 935 also comprises a geared pawl 1050 that is coupled to mechanical yoke 930 of second thermal beam actuator array 925. Translation unit 935 also comprises engagement member 1060 that is coupled to mechanical yoke 950 of third thermal beam actuator array 945. When engagement member 1060 is moved laterally into contact with geared pawl 1050, geared pawl 1050 engages second geared edge 1020 of slider unit 940. When engagement member 1060 is moved laterally out of contact with geared pawl 1050, geared pawl 1050 disengages second geared edge 1010 of slider unit 940.

In order to move latching unit 910 forward (i.e., downwardly with respect to FIG. 9) fourth thermal beam actuator array 955 is activated to laterally move engagement member 1040 into contact with geared pawl 1030 to cause geared pawl 1030 to engage first geared edge 1010 of slider unit 940. Then first thermal beam actuator array 915 is activated to move mechanical yoke 920 and geared pawl 1030 in a forward direction (i.e., downwardly with respect to FIG. 9). This in turn causes slider unit 940 and latching unit 910 to move in a forward direction.

When slider unit 940 and latching unit 910 have been moved to a desired location, third thermal beam actuator array 945 is activated to laterally move engagement member 1060 into contact with geared pawl 1050 to cause geared pawl 1050 to engage second geared edge 1020 of slider unit 940. This locks slider unit 940 into position and stabilizes the position of latching unit 910. First thermal beam actuator array 915 and fourth thermal beam actuator array 955 are then deactivated.

By systematically repeating this process in rapid succession, latching unit 910 can be rapidly moved by macro-scopical amounts (e.g., by amounts up to as much as two hundred microns (200 µm)). Alternatively, when microscopic movements are required (e.g., when discrete steps determined by the dimensions of the gear teeth of slider unit 940 are required), a decrease in the magnitude of the excitation voltage applied to the thermal beam actuator arrays responsible for the forward motion of latching unit 910 will correspondingly reduce the magnitude of the movement (e.g., one micron (1 µm) or less). When a desired location for latching unit 910 is achieved, both geared pawl 1030 and geared pawl 1050 may be engaged to lock latching unit 910 into position.

To cause latching unit 910 to move in the opposite direction (i.e., in a backwards direction) the steps of the process described above are repeated using second thermal beam actuator array 925 and third thermal beam actuator array 945. Specifically, in order to move latching unit 910 backwards (i.e., upwardly with respect to FIG. 9) third thermal beam actuator array 945 is activated to laterally move engagement member 1060 into contact with geared pawl 1050 to cause geared pawl 1050 to engage second geared edge 1020 of slider unit 940. Then second thermal beam actuator array 925 is activated to move mechanical yoke 930 and geared pawl 1050 in a backwards direction (i.e., upwardly with respect to FIG. 9). This in turn causes slider unit 940 and latching unit 910 to move in a backwards direction.

When slider unit 940 and latching unit 910 have been moved to a desired location, fourth thermal beam actuator array 955 is activated to laterally move engagement member 1040 into contact with geared pawl 1030 to cause geared pawl 1030 to engage first geared edge 1010 of slider unit 940. This locks slider unit 940 into position and stabilizes the position of latching unit 910. Second thermal beam actuator array 925 and third thermal beam actuator array 945 are then deactivated.

Figure 11:
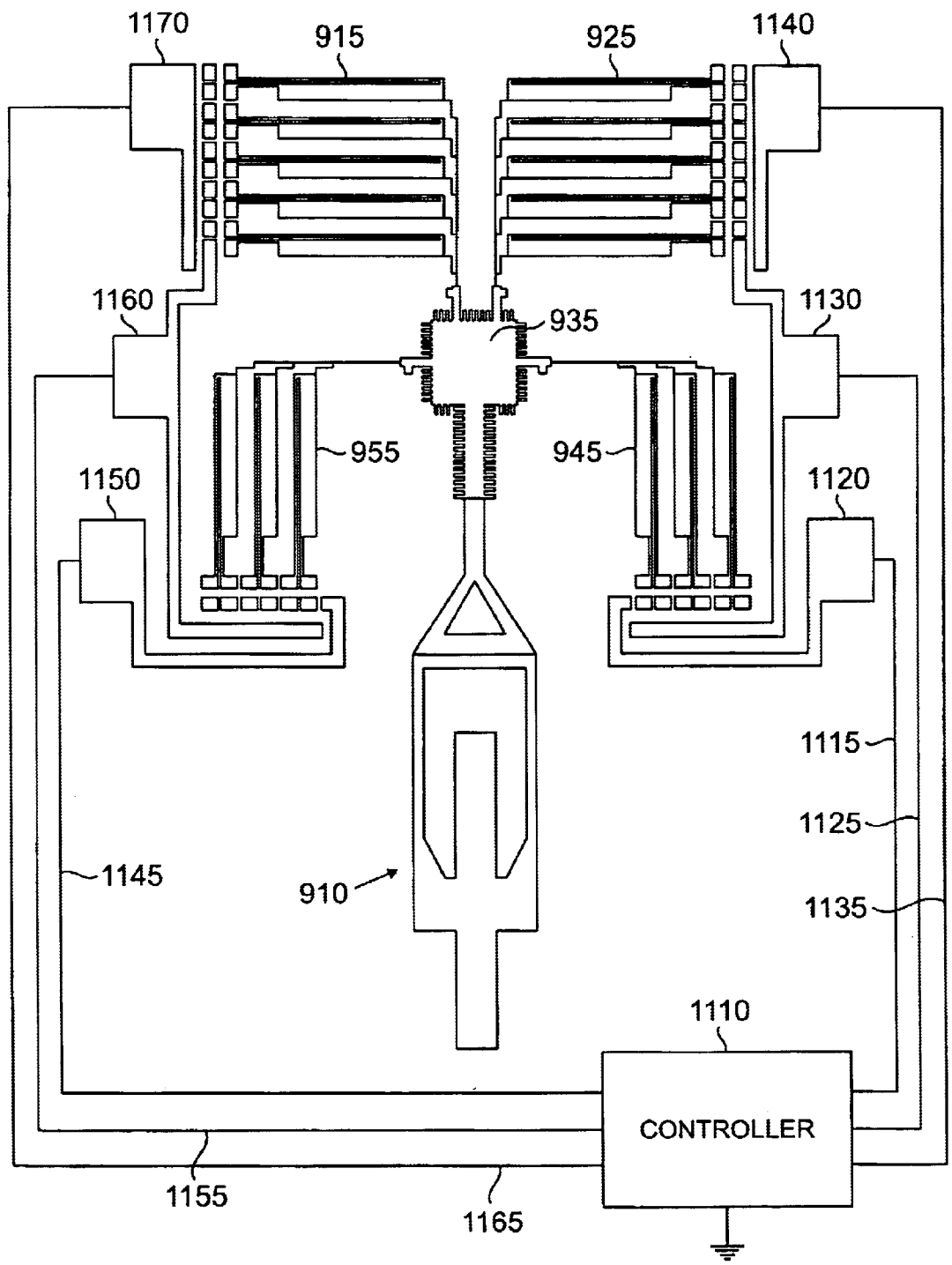
FIG. 11 illustrates a controller for providing control signals to control the operation of an electrothermally actuated microengine of the present invention.

FIG. 11 illustrates a controller 1110 for providing control signals to control the operation of microengine 905. The control signals from controller 1110 activate and deactivate the thermal beam actuator arrays of microengine 905 as described above to provide linear motion to latching unit 910.

As shown in FIG. 11, electrical contact pad 1170 and electrical contact pad 1160 provide electrical connections to operate first thermal beam actuator array 915. Electrical contact pad 1140 and electrical contact pad 1130 provide electrical connections to operate second thermal beam actuator array 925. Electrical contact pad 1130 and electrical contact pad 1120 provide electrical connections to operate third thermal beam actuator array 945. Electrical contact pad 1160 and electrical contact pad 1150 provide electrical connections to fourth thermal beam actuator array 945.

Control signal line 1115 couples controller 1110 and electrical contact pad 1120. Control signal line 1125 couples controller 1110 and electrical contact pad 1130. Control signal line 1135 couples controller 1110 and electrical contact pad 1140.

Similarly, control signal line 1145 couples controller 1110 and electrical contact pad 1150. Control signal line 1155 couples controller 1110 and electrical contact pad 1160. Control signal line 1165 couples controller 1110 and electrical contact pad 1170.

Controller 1110 is capable of sending control signals through a control signal line (1115, 1125, 1135, 1145, 1155, 1165) to its respective electrical contact pads (1120, 1130, 1140, 1150, 1160, 1170) of microengine 905. In one embodiment of the invention, the control signals from controller 1110 are voltage signals. In an alternate embodiment of the invention, the control signals from controller 1110 are current signals. By sending an appropriate set of control signals controller 1110 is capable of macroscopically or microscopically adjusting the position of latching unit 910 by moving slider unit 940 in the manner previously described.

Figure 12:
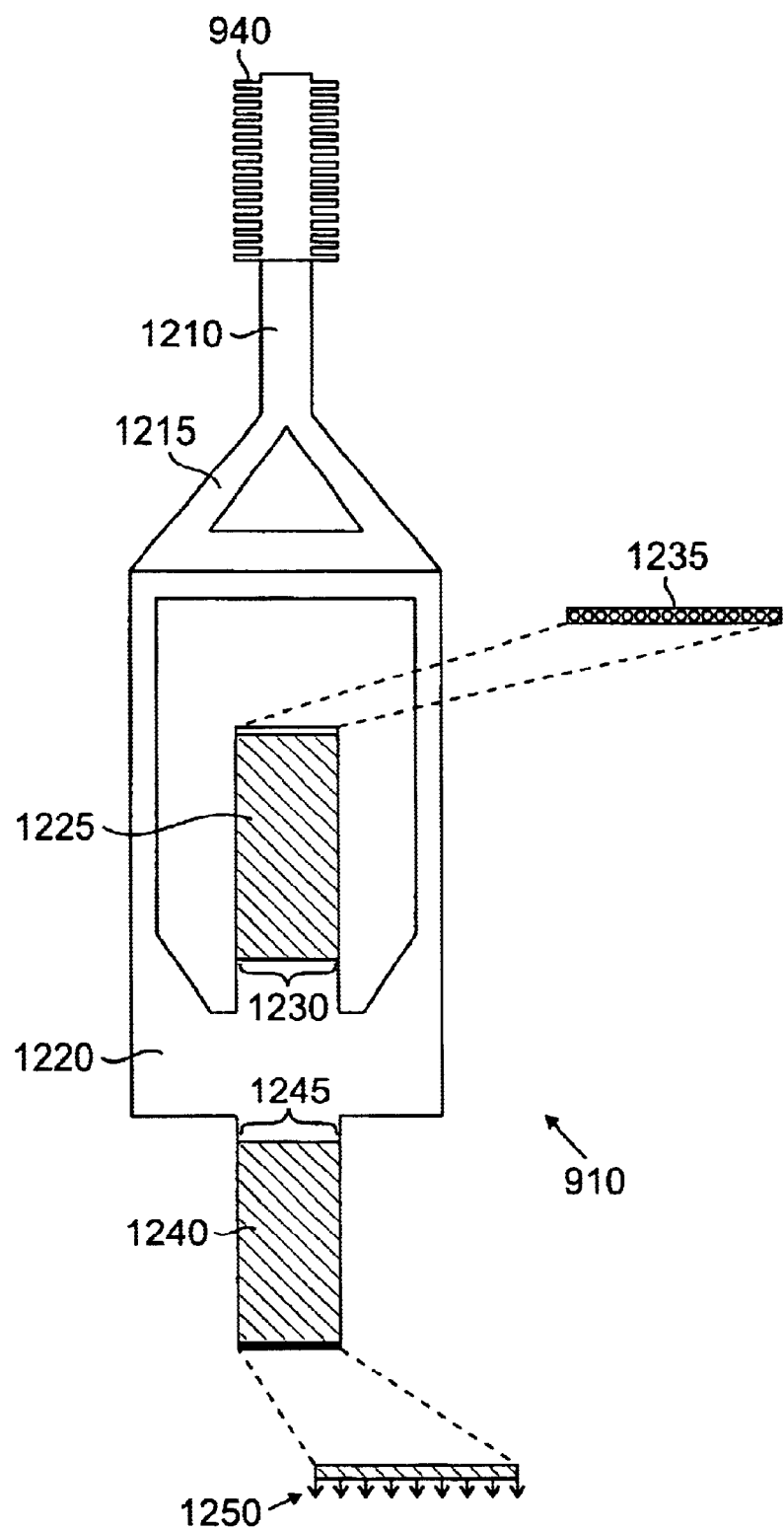
FIG. 12 illustrates a detailed view of a latching unit of an electrothermally actuated microengine of the present invention.

FIG. 12 illustrates a detailed view of latching unit 910 of the present invention. The original unfolded structure of latching unit 910 is generally a flat polysilicon structure. Latching unit 1240 comprises a first hinge plate 1225 and a second hinge plate 1240 that fold up out of the plane of latching unit 910. The other portions of latching unit 910 are planar in that they do not move out of the original plane of latching unit 910.

Latching unit 910 comprises a first plate, portion 1210, a yoke 1215, and a frame portion 1220. One end of first plate portion 1210 is coupled to slider unit 940. The other end of first plate portion 1210 is coupled to yoke 1215. Yoke 1215 in turn is rigidly coupled to frame portion 1220. That is, yoke 1215 does not fold or bend with respect to the plane of frame portion 1220.

Frame portion 1220 is formed having portions that define a first hinge plate 1225 and a second hinge plate 1240. First hinge plate 1225 may be folded upwardly from frame portion 1220 along hinge line 1230. The distal end of first hinge plate 1225 is formed having portions that define a plurality of latching windows 1235. Latching windows 1235 are adapted to receive a plurality of latching units 1250 on the distal end of second hinge plate 1240.

Second hinge plate 1240 may be folded upwardly from frame portion 1220 along hinge line 1245. The distal end of second hinge plate 1240 is formed having portions that define a plurality of latching units 1235 that are designed to be received by the plurality of latching windows 1235 on the distal end of first hinge plate 1225.

Latching units 1250 may be in the form of arrowheads, microrivets, or other similar structures that are capable of deforming (i.e., changing their shape) when being passed through latching windows 1235 and reforming (i.e., regaining their shape) after they have passed through latching windows 1235. In this manner the latching units 1250 form a secure connection with the latching windows 1235. This ensures that the distal end of first hinge plate 1225 and the distal end of second hinge plate 1240 remain securely connected.

A triangular passageway formed by the surface of frame portion 1220, and the surface of first hinge plate 1225, and the surface of second hinge plate 1240 enables latching unit 910 to be secured to another structure (not shown in FIG. 12). Placing first hinge plate 1225 and second hinge plate 1240 around a structure and securing the distal ends as described above provides a mechanical gripper for attaching microengine 905 to the structure.

Figure 13:
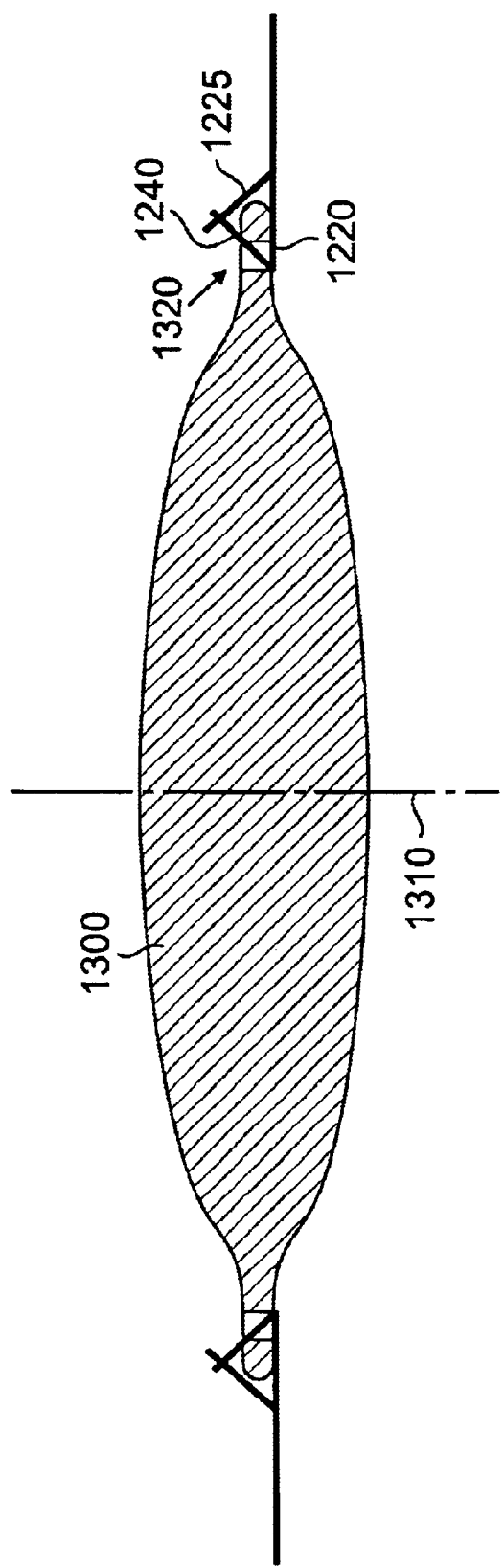
FIG. 13 illustrates a cross sectional side view of an elastically deformable lens coupled to latching units of an electrothermally actuated microengine of the present invention.

FIG. 13 illustrates a cross sectional side view of an elastically deformable lens 1300. The optical axis of lens 1300 is shown as dotted line 1310. Elastically deformable lens 1300 is formed having portions that define a plurality of apertures around the periphery of elastically deformable lens 1300. One of the plurality of apertures is referred to with reference numeral 1320. FIG. 13 shows how latching unit 910 may be attached to elastically deformable lens 1300 through aperture 1320.

As shown in FIG. 13, a triangular passageway formed by the surface of frame portion 1220, and the surface of first hinge plate 1225, and the surface of second hinge plate 1240 enables latching unit 910 to be secured to elastically deformable lens 1300 through aperture 1320. To attach latching unit 910 to elastically deformable lens 1300 second hinge plate 1240 is folded upward from frame portion 1220 and passed through aperture 1320. First hinge plate 1225 is folded up from frame portion 1220 and the distal end of first hinge plate 1225 is secured to the distal end of second hinge plate 1240 while second hinge plate 1240 is within aperture 1320. This securely couples latching unit 910 (and microengine 905) to one edge of elastically deformable lens 1300. Other apertures in elastically deformable lens 1300 may also be similarly connected to a latching unit and associated microengine.

Figure 14:
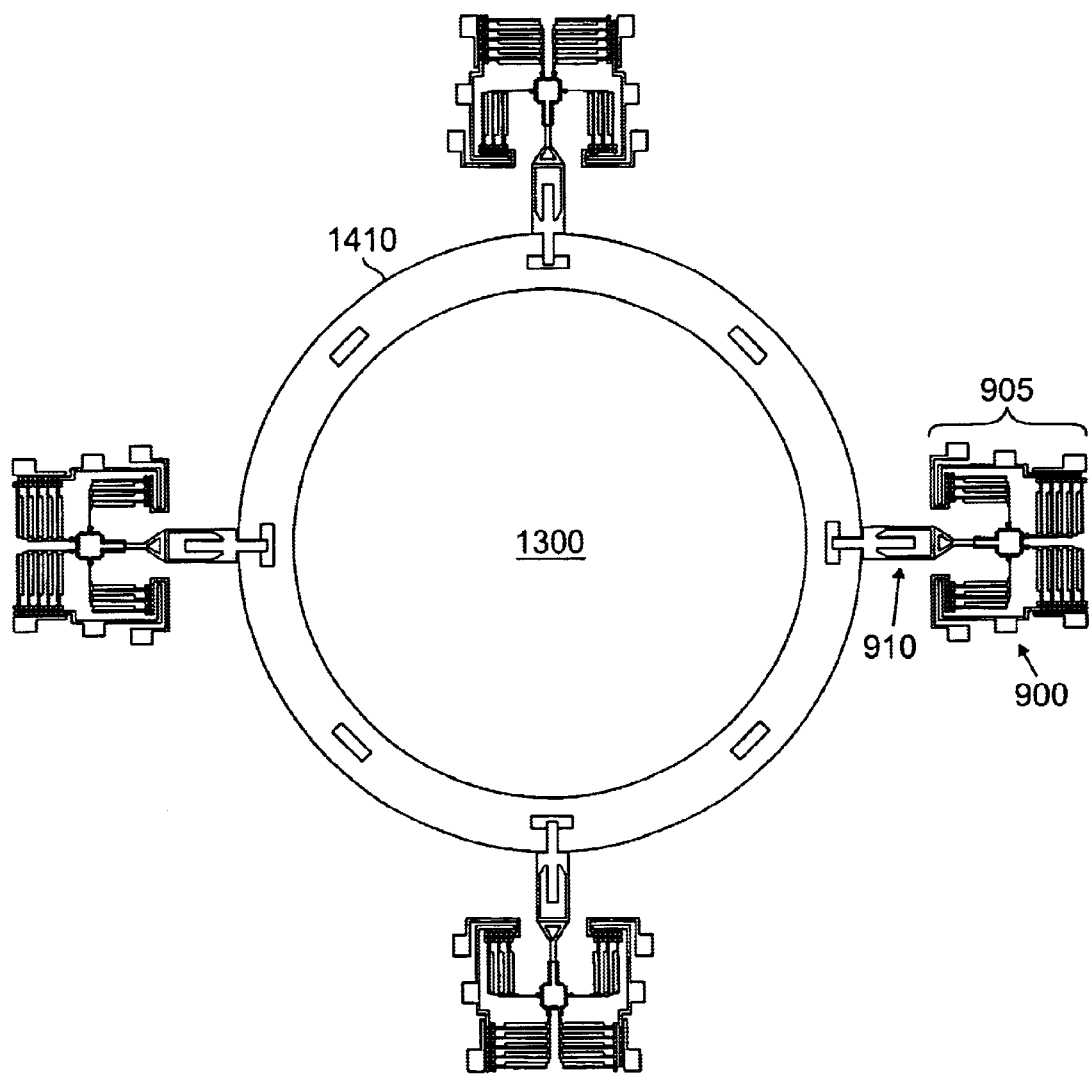
FIG. 14 illustrates a schematic plan view of an elastically deformable lens showing how a plurality of microengines and latching units of the present invention may be attached to the periphery of the elastically deformable lens.

FIG. 14 illustrates a schematic plan view of elastically deformable lens 1300 showing a how plurality of microengine assemblies 900 may be attached to the periphery 1410 of elastically deformable lens 1300. Each microengine assembly 900 comprises a microengine 905 and a latching unit 910. Each microengine assembly 900 is positioned so that latching unit 910 may be coupled to elastically deformable lens 1300 through perforations in the lens periphery 1410. In an advantageous embodiment of the present invention, for each microengine assembly 900 at a first position at the periphery 1410 of elastically deformable lens 1300 there is another microengine assembly 900 located at a second position that is located diametrically opposite from the first position.

Although FIG. 14 illustrates four (4) microengine assemblies 900, the number four is exemplary. It is understood that some number other than four (4) such microengine assemblies 900 may be used. In one advantageous embodiment of the present invention, twelve (12) microengine assemblies 900 are coupled to elastically deformable lens 1300.

Figure 15:
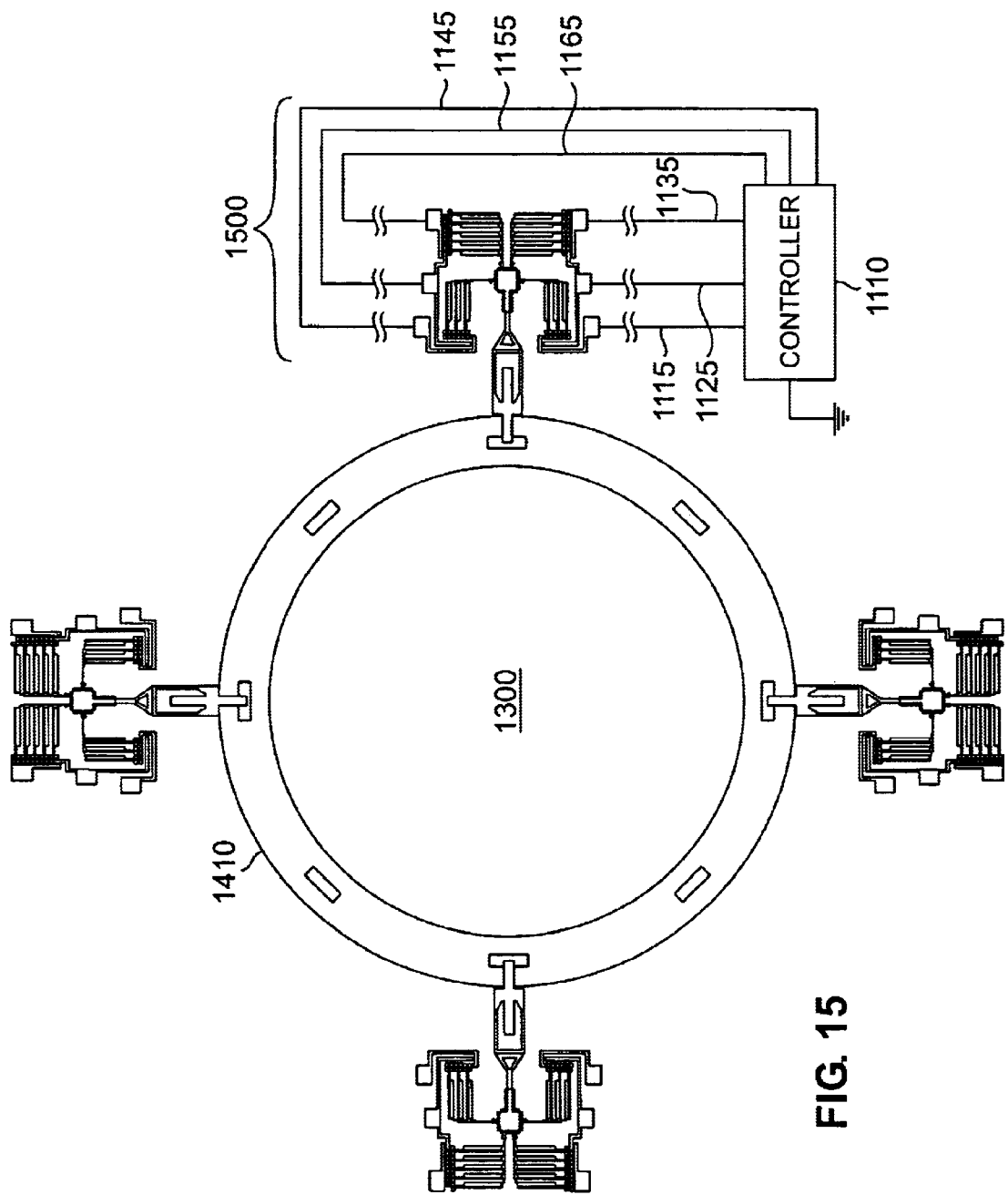
FIG. 15 illustrates an exemplary circuit for tensioning the periphery of an elastically deformable lens in accordance with the principles of the present invention.

FIG. 15 illustrates an exemplary circuit 1500 for tensioning the periphery 1410 of elastically deformable lens 1300 in accordance with the principles of the present invention. Each microengine assembly 900 attached to periphery 1410 of lens 1300 is controlled by a controller. In one advantageous embodiment of the invention, each microengine assembly 900 is controlled by a separate controller 1110. The separate controllers 1110 may be themselves, in turn, controlled by a master controller (not shown in FIG. 15). In another advantageous embodiment of the invention, all of the microengine assemblies 900 attached to the periphery 1410 of lens 1300 are controlled by a master controller (not shown in FIG. 15).

In the exemplary circuit 1500 shown in FIG. 15, controller 1110 sends one or more control signals to microengine 905 to change the tension in the periphery 1410 of lens 1300 by changing the position of latching unit 910. Each controller 1110 connected to the periphery 1410 of lens 103 may be coordinated to retract and expand the periphery 1410 of lens 1300 according to predetermined parameters. Expansion and retraction may be accomplished in concert with all controllers providing an adjustment of periphery 1410 over the same distance and in the same direction. In addition, the distance and direction may be varied in each controller 1110 to provide a special focus, such as astigmatic focus. Circuit 1500 operates using control signals in the manner previously described with reference to FIG. 11.

As previously described, each microengine assembly 900 is capable of functioning in two distinct modes. In the first mode, each microengine assembly 900 is capable of producing macroscopic mechanical translations on the order of two hundred microns (200 $\mu$m) in order to engage latching element 910 of microengine assembly 900 with aperture 1320 through periphery 1410 of lens 1300. In the second mode, each microengine assembly 900 is capable of producing microscopic mechanical translations on the order of one micron (1 $\mu$m) in order to focus lens 1300.

Figure 16:
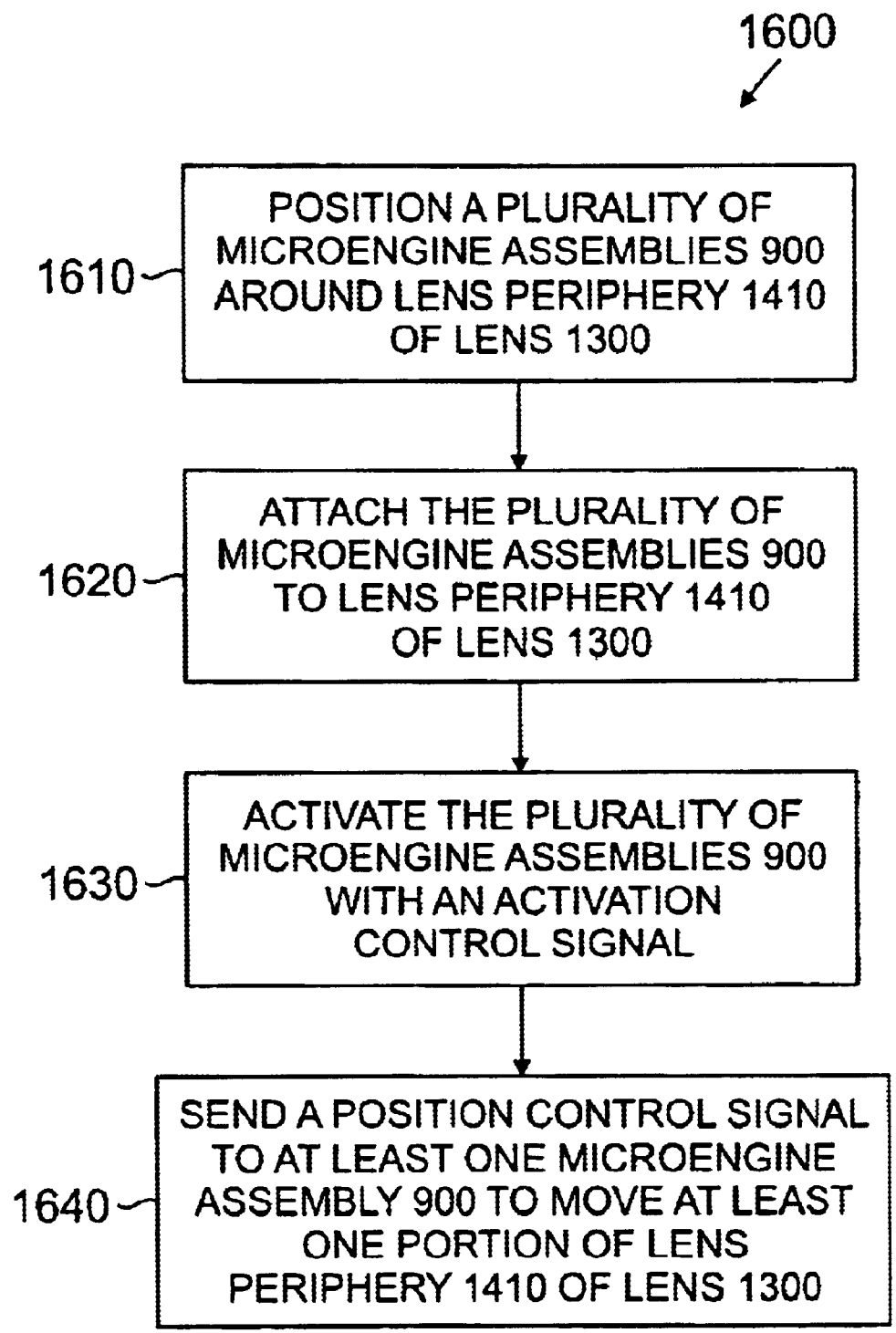
FIG. 16 illustrates a flow diagram of an advantageous embodiment of a method for utilizing electrothermally actuated microengines and latching units to focus an elastically deformable lens in accordance with the principles of the present invention.

FIG. 16 illustrates a flow diagram of a method for utilizing microengine assemblies 900 to focus an elastically deformable lens 1300 in accordance with the principles of the present invention. The steps of the method are collectively referred to with reference numeral 1600.

Elastically deformable lens 1300 is formed with perforations around the lens periphery 1410. Lens 1300 is positioned in a relaxed state. A plurality of microengine assemblies 900 are positioned around periphery 1410 of lens 1300. Each microengine assembly 900 comprises a microengine 905 and a latching unit 910. In one advantageous embodiment of the method of the present invention, each microengine assembly 900 is located directly opposite and across from another microengine assembly 900 on the periphery 1410 of lens 1300 (step 1610).

Each microengine assembly 900 is positioned so that latching unit 910 may be coupled to the lens periphery 1410 through an aperture 1320 in periphery 1410. As previously described, second hinge plate 1240 is passed through aperture 1320 in periphery 1410 and joined to first hinge plate 1225 of latching unit 910. The joining of the ends of second hinge plate 1240 and first hinge plate 1225 couples latching unit 910 (and microengine assembly 900) to lens periphery 1410. Each microengine assembly 900 is attached to lens 1300 in the same manner (step 1620).

In order to focus the lens, voltage is applied to each microengine assembly 900 by a controller (e.g., controller 1110). Each controller for each microengine assembly 900 is coordinated with all the other controllers for proper lens adjustment. Each controller sends an activation control signal (such as a voltage signal or a current signal) to activate its respective microengine assembly 900 (step 1630).

Each controller then sends a position control signal (such as a voltage signal or a current signal) to either extend or retract latching unit 910 (step 1640). The extension of latching unit 910 reduces the diameter of lens 1300 for focusing purposes. Similarly, the retraction of latching unit 910 increases the diameter of lens 1300 for focusing purposes. Generally, at least one position control signal is sent to at least one microengine assembly 900 to move at least one portion of lens periphery 1410 of lens 1300 (step 1640). The present invention provides microengine assemblies 900 that are capable of moving lens periphery 1410 of lens 1300 in micron (1 μm) size steps in order to provide an extremely accurate lens focus.

Each controller (e.g., controller 1110) may be adjusted separately in order to provide astigmatic correction. Depending upon the number of microengine assemblies 900 that are employed, the various combinations of positions for each latching unit 910 of each microengine assembly 900 allow a very large number of focusing orientations to be achieved. Each microengine assembly 900 receives a position control signal that may or may not be the same as the position control signal received by the other microengine assemblies 900 attached to lens periphery 1410. If all microengine assemblies 900 receive a position control signal to retract or extend their respective latching unit 910 by the same distance, the action is a simple focusing operation. By inducing different amounts of small displacement changes in different meridians of the equatorial diameter of the elastically deformable lens 1300, the optical power of the lens 1300 in different meridians can be controlled. In this manner a variable focus astigmatic lens can be provided.

The microengine assemblies 900 of the present invention are extremely small and are relatively inexpensive to produce. Employing microengine assemblies 900 with individual controllers around the periphery 1410 of an elastically deformable lens 1300 provides an extremely accurate adjustable lens that can make both normal optical adjustments and astigmatic optical adjustments.

The invention having now been fully described, it should be understood that it may be embodied in other specific forms or variations without departing from its spirit or essential characteristics. Accordingly, the embodiments described above are to be considered in all respects as illustrative and not restrictive, the scope of the invention being indicated by the appended claims rather than the foregoing description, and all changes which come within the meaning and range of equivalency of the claims are intended to be embraced therein.

What is claimed is:

1. An apparatus for focusing an elastically deformable lens, said apparatus comprising:
    a plurality of microengine assemblies coupled to a periphery of an elastically deformable lens in a plane perpendicular to an optical axis of said lens, wherein each microengine assembly of said plurality of microengine assemblies is capable of adjusting radial tension in said lens; and
    a controller coupled to said plurality of microengine assemblies wherein said controller is capable of controlling an operation of each microengine assembly of said plurality of microengine assemblies to adjust radial tension in said lens to focus said lens.

2. The apparatus as claimed in claim 1 wherein each microengine assembly of said plurality of microengine assemblies is located opposite another microengine assembly around said periphery of said lens.

3. The apparatus as claimed in claim 1 wherein each microengine assembly of said plurality of microengine assemblies comprises:
    an electrothermally actuated microengine capable of receiving at least one control signal from said controller; and
    a latching unit coupled to said electrothermally actuated microengine wherein said latching unit is capable of being coupled to said periphery of said lens to secure said microengine assembly to said periphery of said lens.

4. The apparatus as claimed in claim 3 wherein said electrothermally actuated microengine comprises:
    a translation unit comprising a slider unit that is coupled to said latching unit;
    at least one thermal beam actuator array capable of causing said slider unit to move; and
    at least one thermal beam actuator array capable of causing said slider unit to remain in a fixed position.

5. The apparatus as claimed in claim 4 wherein said electrothermally actuated microengine further comprises:
    a first thermal beam actuator array capable of causing said slider unit to move in a forward direction;
    a second thermal beam actuator array capable of causing said slider unit to move in a backward direction;
    a third thermal beam actuator array capable of causing a first engagement member to engage said slider unit to cause said slider unit to be movable by said second thermal beam actuator array; and
    a fourth thermal beam actuator array capable of causing a second engagement member to engage said slider unit to cause said slider unit to be movable by said first thermal beam actuator array.

6. The apparatus as claimed in claim 3 wherein said latching unit comprises:
    a first hinge plate comprising a distal end having portions that form a plurality of latching windows; and
    a second hinge plate comprising a distal end having portions that form a plurality of latching elements, said plurality of latching elements capable of being received within said plurality of latching windows of said first hinge plate to lock together said distal end of said first hinge plate and said distal end of said second hinge plate.

7. The apparatus as claimed in claim 1 wherein said controller is capable of focusing said lens by adjusting a position of a slider unit in each microengine assembly of said plurality of microengine assemblies.

8. A lens focusing system comprising:
    an elastically deformable lens wherein said lens has portions that form a plurality of apertures through a periphery of said lens, and wherein said plurality of apertures are evenly spaced around said periphery of said lens;
    a plurality of microengine assemblies coupled to said periphery of said lens in a plane perpendicular to an optical axis of said lens, wherein each microengine assembly of said plurality of microengine assemblies is capable of adjusting radial tension in said lens; and
    a controller coupled to said plurality of microengine assemblies wherein said controller is capable of controlling an operation of each microengine assembly of said plurality of microengine assemblies to adjust radial tension in said lens to focus said lens.

9. The lens focusing system as claimed in claim 8 wherein each microengine assembly of said plurality of microengine assemblies is located opposite another microengine assembly around said periphery of said lens.

10. The lens focusing system as claimed in claim 8 wherein each microengine assembly of said plurality of microengine assemblies comprises:
an electrothermally actuated microengine capable of receiving at least one control signal from said controller; and
a latching unit coupled to said electrothermally actuated microengine wherein said latching unit is capable of being coupled to said periphery of said lens to secure said microengine assembly to said periphery of said lens.

11. The lens focusing system as claimed in claim 10 wherein said electrothermally actuated microengine comprises:
a translation unit comprising a slider unit that is coupled to said latching unit;
at least one thermal beam actuator array capable of causing said slider unit to move; and
at least one thermal beam actuator array capable of causing said slider unit to remain in a fixed position.

12. The lens focusing system as claimed in claim 11 wherein said electrothermally actuated microengine further comprises:
a first thermal beam actuator array capable of causing said slider unit to move in a forward direction;
a second thermal beam actuator array capable of causing said slider unit to move in a backward direction;
a third thermal beam actuator array capable of causing a first engagement member to engage said slider unit to cause said slider unit to be movable by said second thermal beam actuator array; and
a fourth thermal beam actuator array capable of causing a second engagement member to engage said slider unit to cause said slider unit to be movable by said first thermal beam actuator array.

13. The lens focusing system as claimed in claim 10 wherein said latching unit comprises:
a first hinge plate comprising a distal end having portions that form a plurality of latching windows; and
a second hinge plate comprising a distal end having portions that form a plurality of latching elements, said plurality of latching elements capable of being received within said plurality of latching windows of said first hinge plate to lock together said distal end of said first hinge plate and said distal end of said second hinge plate.

14. The lens focusing system as claimed in claim 8 wherein said controller is capable of focusing said lens by adjusting a position of a slider unit in each microengine assembly of said plurality of microengine assemblies.

15. A method for focusing an elastically deformable lens comprising the steps of:
coupling a plurality of microengine assemblies to a periphery of an elastically deformable lens in a plane perpendicular to an optical axis of said lens wherein each microengine assembly in said plurality of microengine assemblies is capable of adjusting radial tension in said lens;
coupling a controller to said plurality of microengine assemblies; and
focusing said lens by controlling with said controller an operation of each microengine assembly of said plurality of microengine assemblies to adjust radial tension in said lens.

16. The method as claimed in claim 15 further comprising the step of:
locating each microengine assembly of said plurality of microengine assemblies opposite another microengine assembly around said periphery of said lens.

17. The method as claimed in claim 15 further comprising the steps of:
providing in each microengine assembly an electrothermally actuated microengine that is capable of receiving at least one control signal from said controller;
coupling a latching unit to said electrothermally actuated microengine; and
coupling said latching unit to said periphery of said lens to secure said microengine assembly to said periphery of said lens.

18. The method as claimed in claim 17 further comprising the steps of:
providing in each electrothermally actuated microengine a translation unit that comprises a slider unit that is coupled to said latching unit;
causing said slider unit to move by using at least one thermal beam actuator array; and
causing said slider unit to remain in a fixed position by using at least one thermal beam actuator array.

19. The method as claimed in claim 18 further comprising the steps of:
causing said slider unit to move in a forward direction by using a first thermal beam actuator array;
causing said slider unit to move in a backward direction by using a second thermal beam actuator array;
using a third thermal beam actuator array to cause a first engagement member to engage said slider unit to cause said slider unit to be movable by said second thermal beam actuator array; and
using a fourth thermal beam actuator array to cause a second engagement member to engage said slider unit to cause said slider unit to be movable by said first thermal beam actuator array.

20. The method as claimed in claim 17 further comprising the steps of:
providing in each microengine assembly a latching unit that comprises a first hinge plate comprising a distal end having portions that form a plurality of latching windows and a second hinge plate that comprises a distal end having portions that form a plurality of latching elements;
placing said distal end of said second hinge plate through an aperture of said periphery of said lens;
placing said distal end of said first hinge plate adjacent to said distal end of said second hinge plate;
receiving said plurality of latching elements of said second hinge plate within said plurality of latching windows of said first hinge plate; and
locking together said distal end of said first hinge plate and said distal end of said second hinge plate.

21. The method as claimed in claim 15 further comprising the step of:
focusing said lens by using said controller to adjust a position of a slider unit in each microengine assembly of said plurality of microengine assemblies.

* * * * *